J. H. WAGENHORST.
VEHICLE WHEEL RIM.
APPLICATION FILED SEPT. 28, 1912.
1,201,119.
Patented Oct. 10, 1916.
10 SHEETS—SHEET 5.
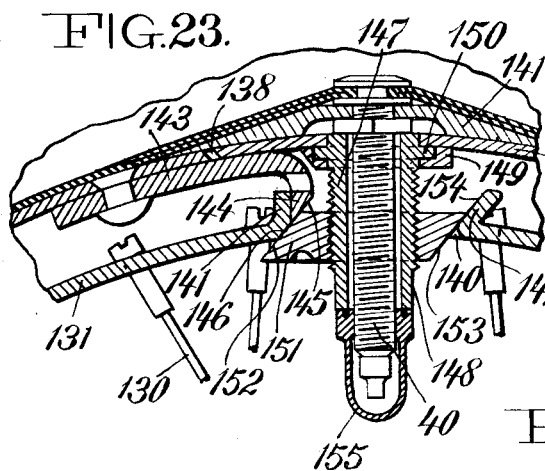
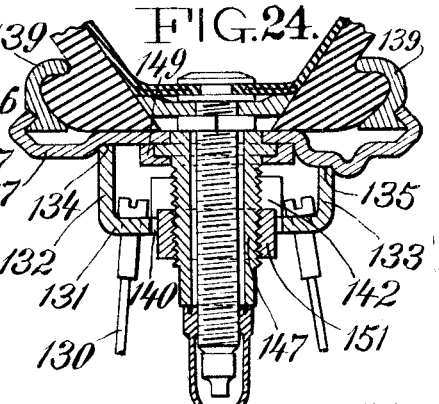
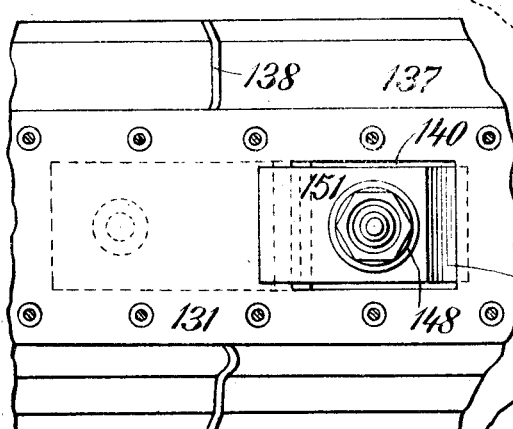
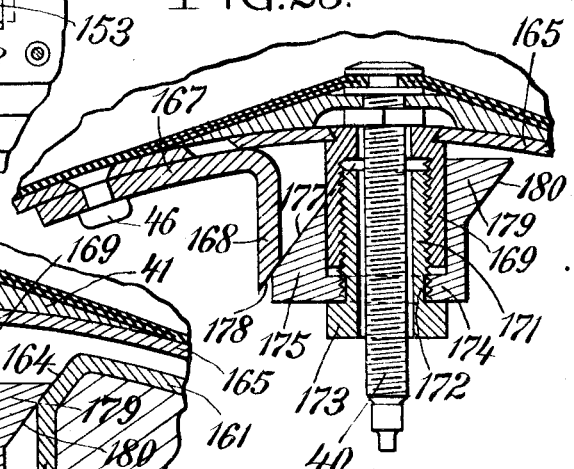
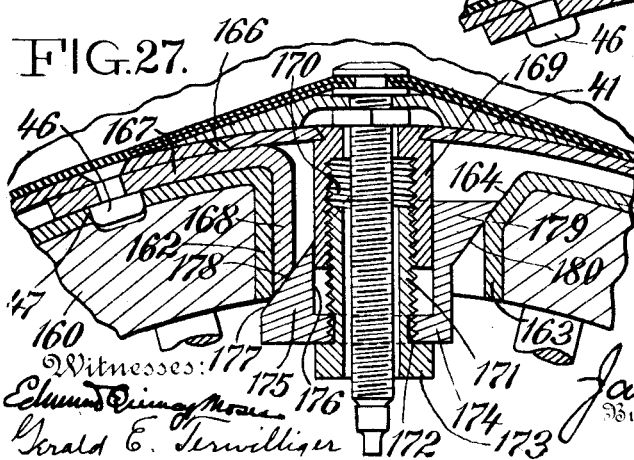
Witnesses:
Inventor
James H. Wagenhorst
By his Attorney
Seward Davis

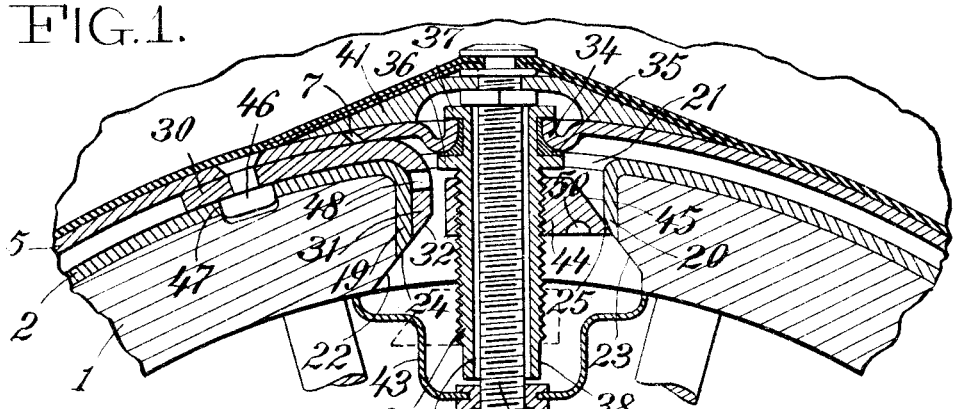
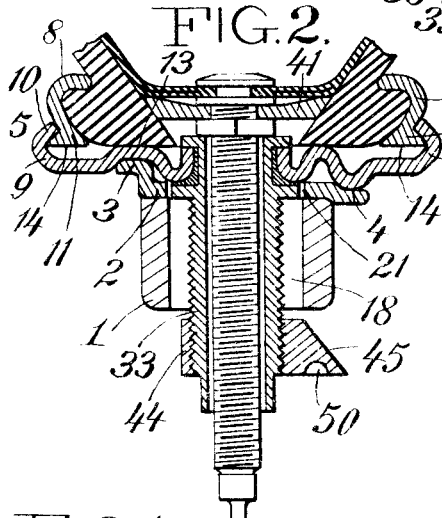
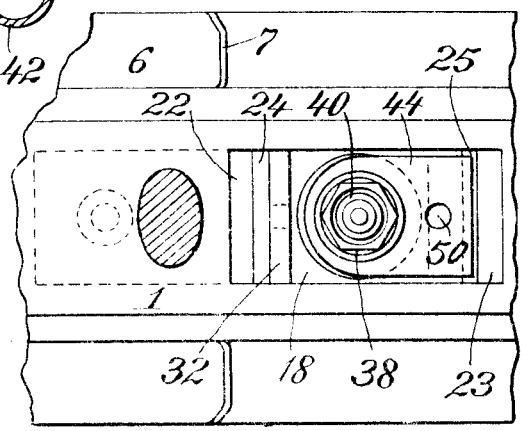
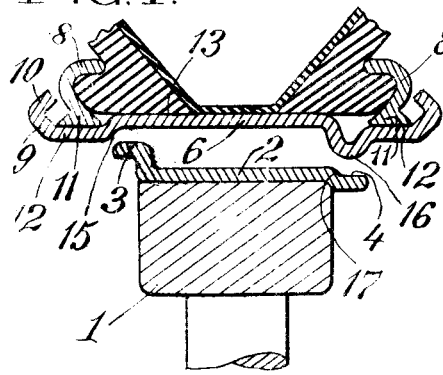
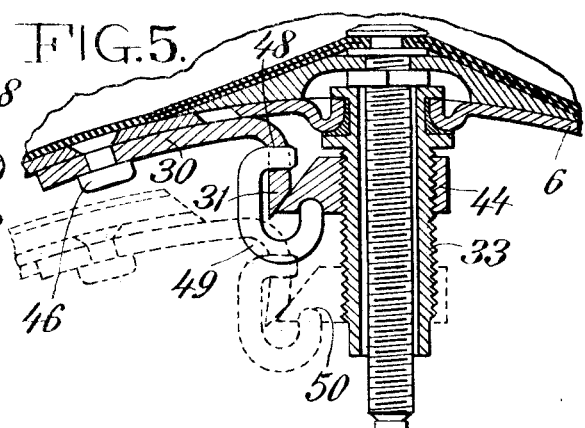

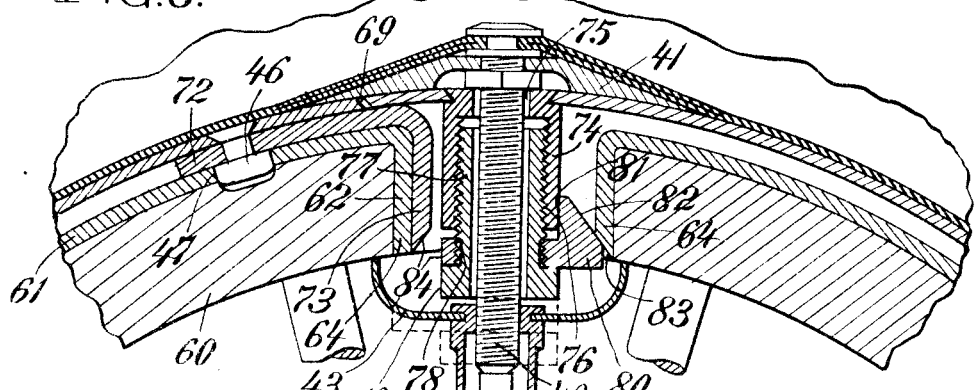
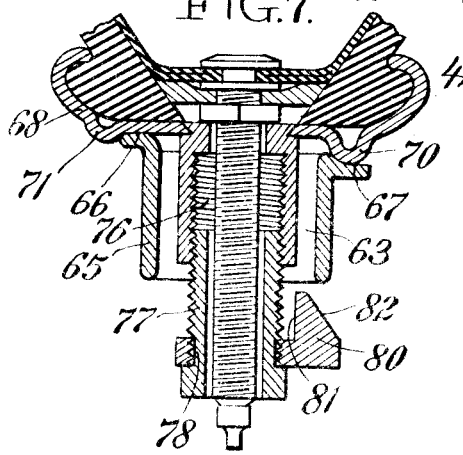
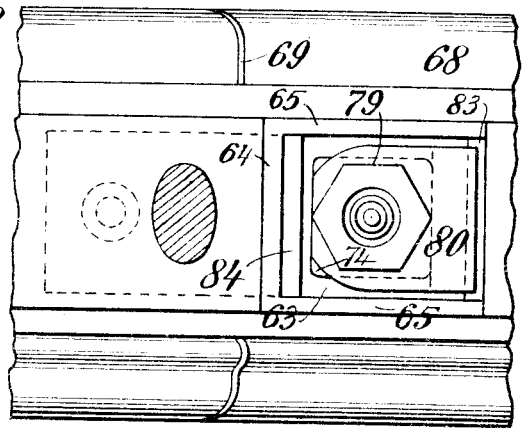
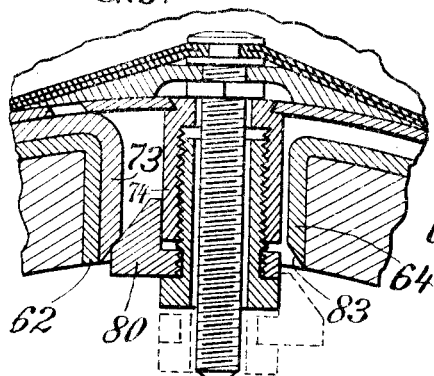
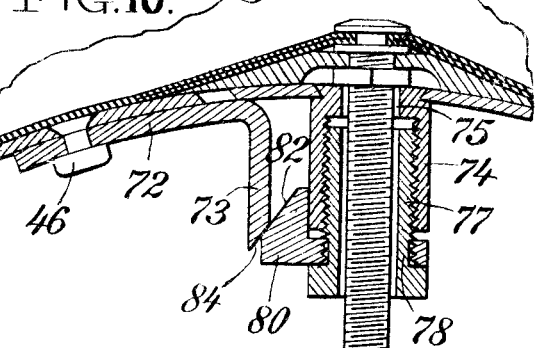

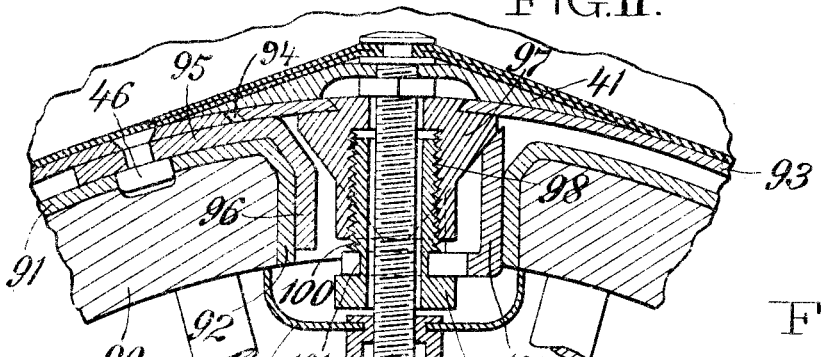
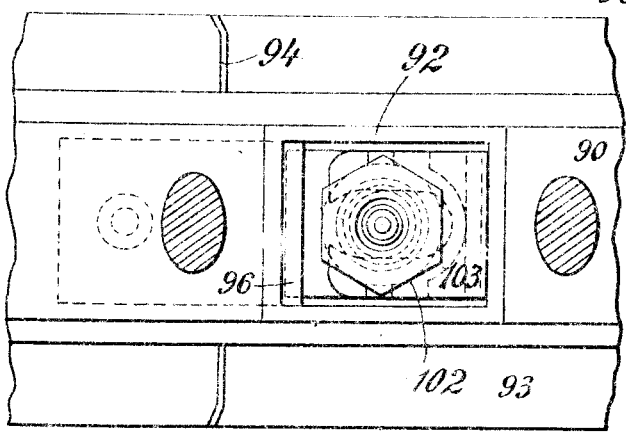
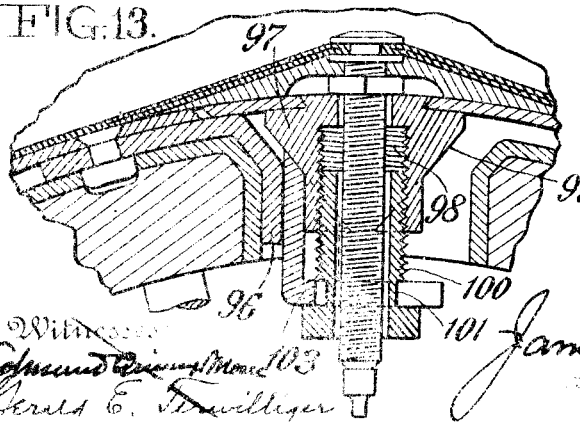
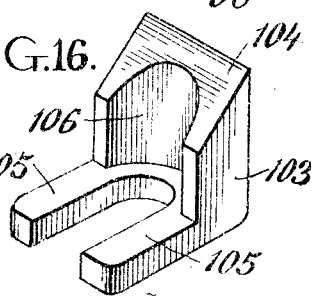

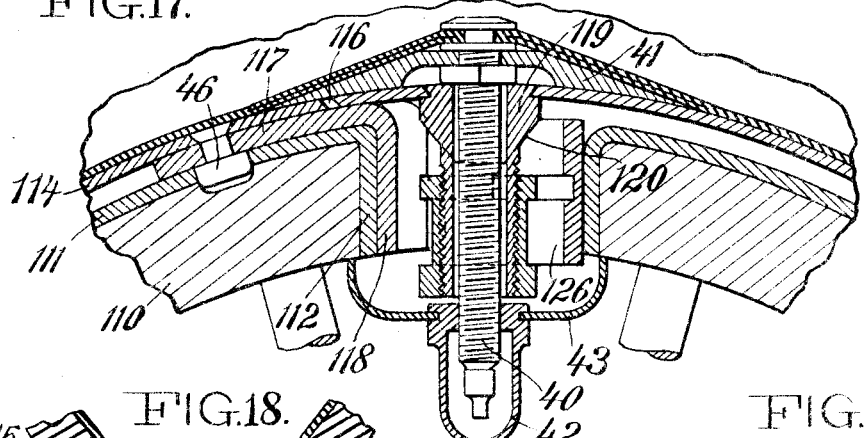
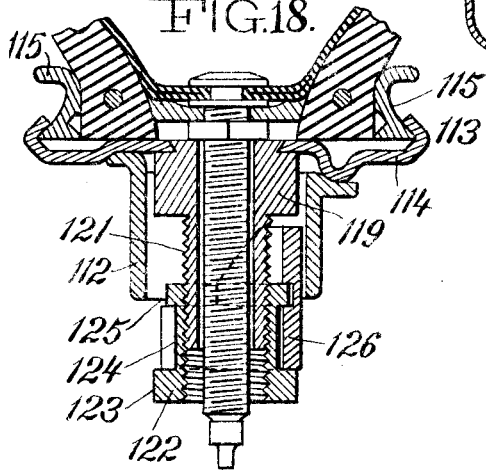
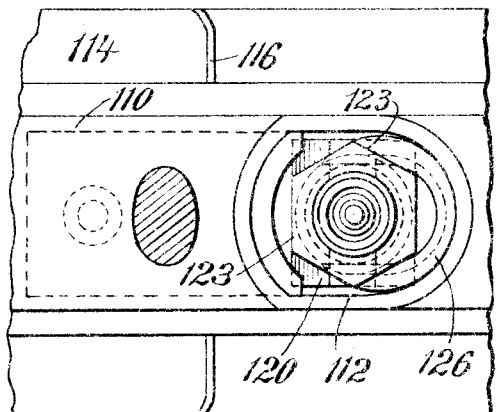
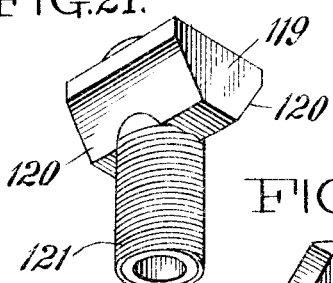
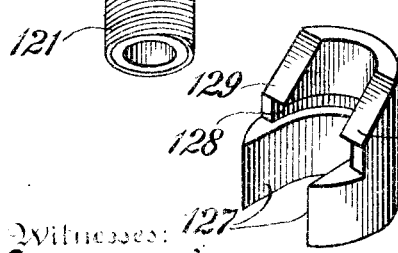

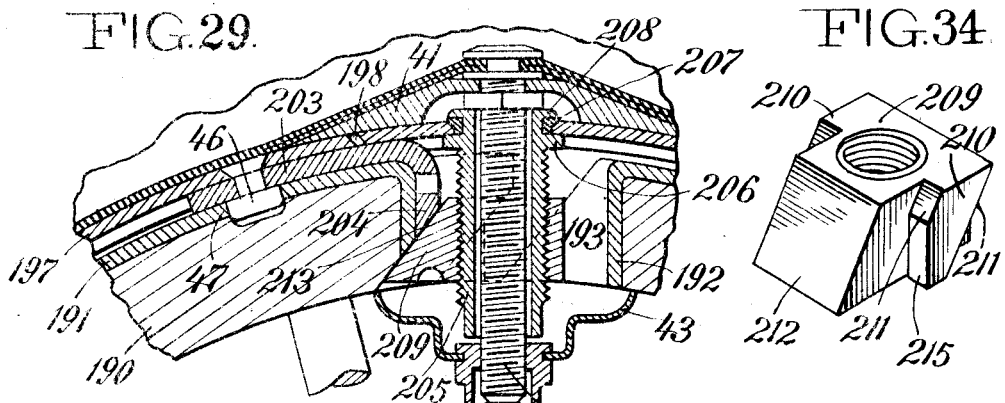
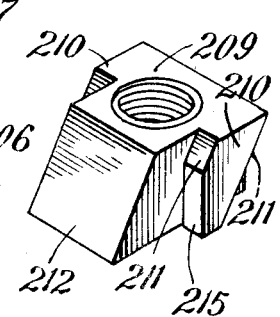
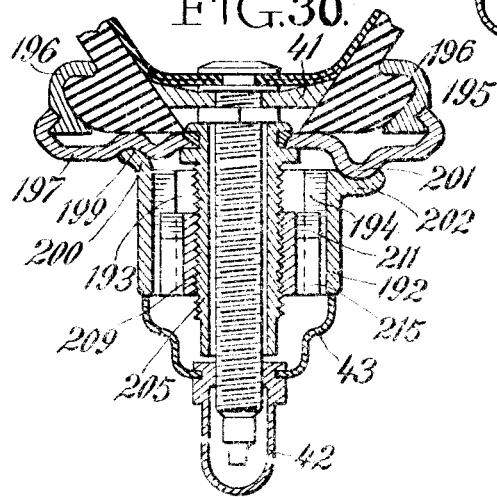
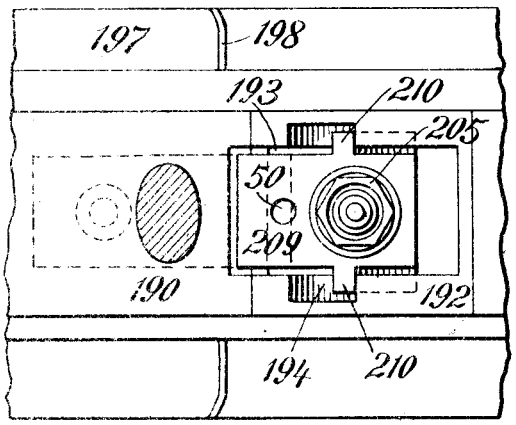
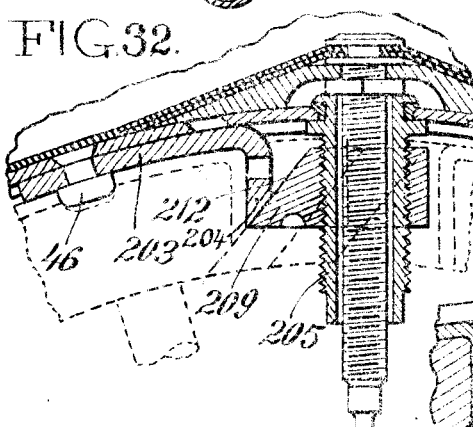
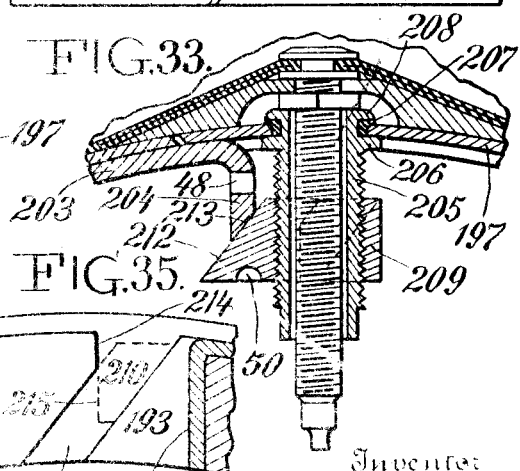

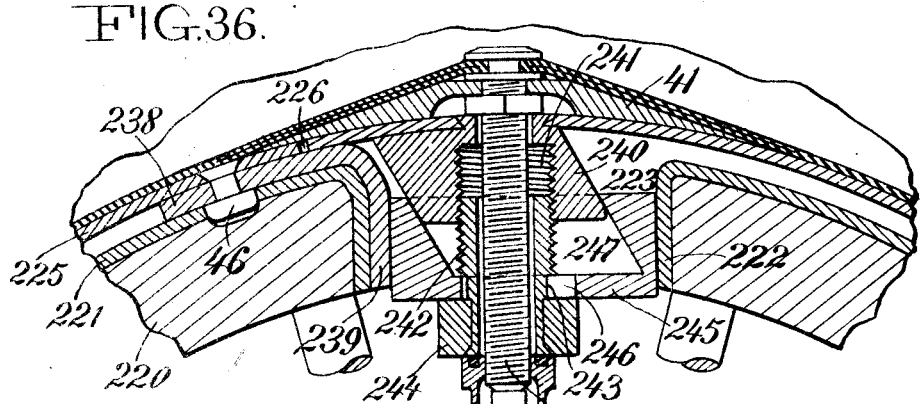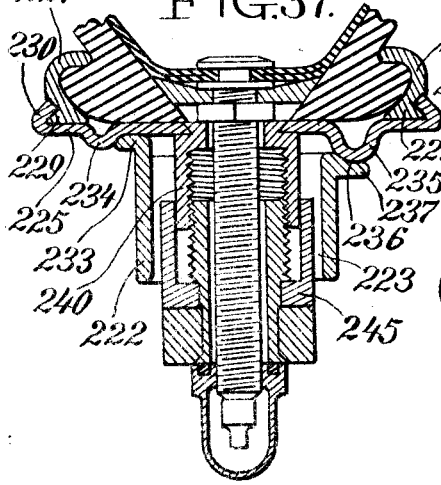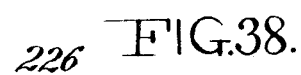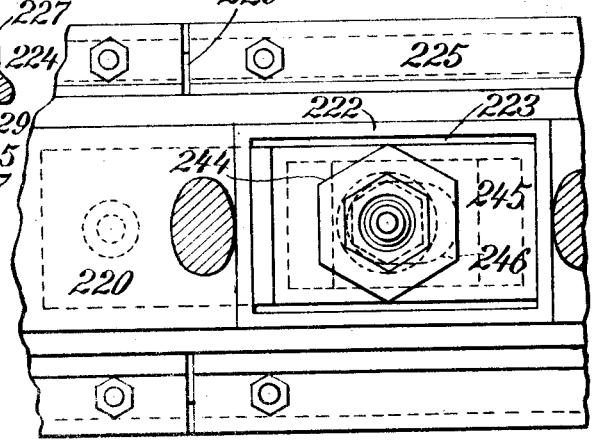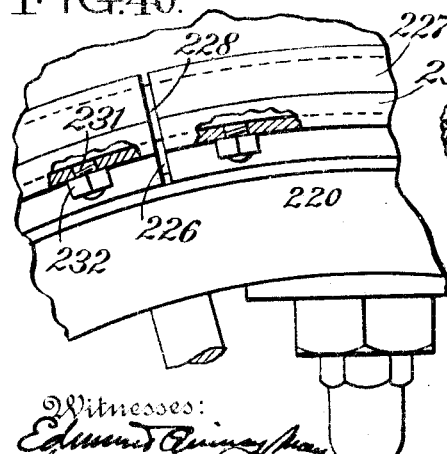

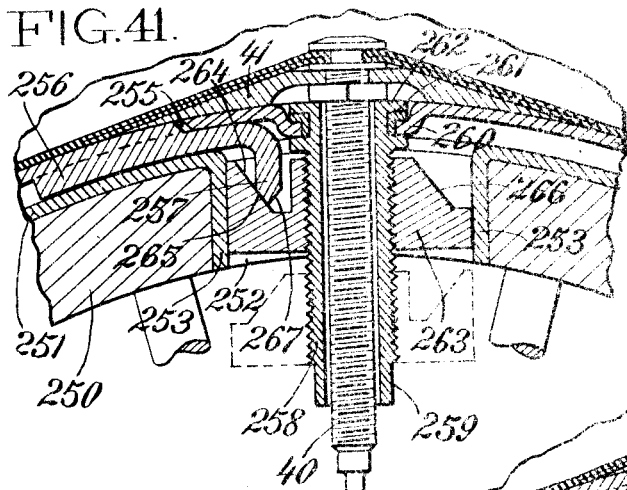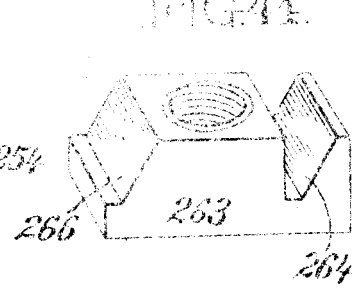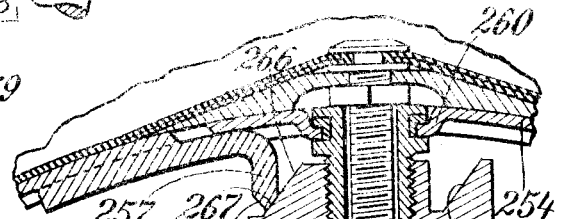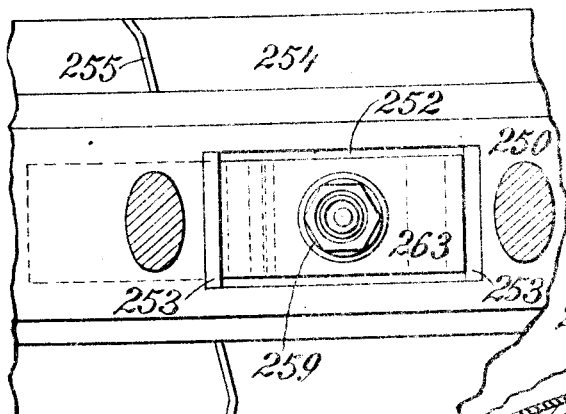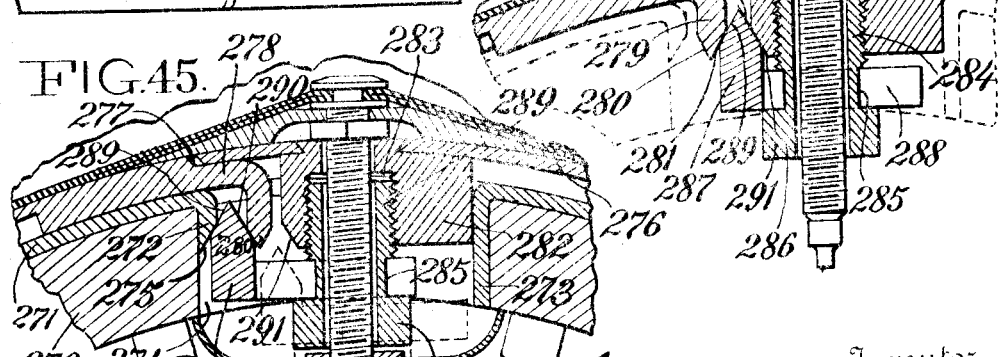

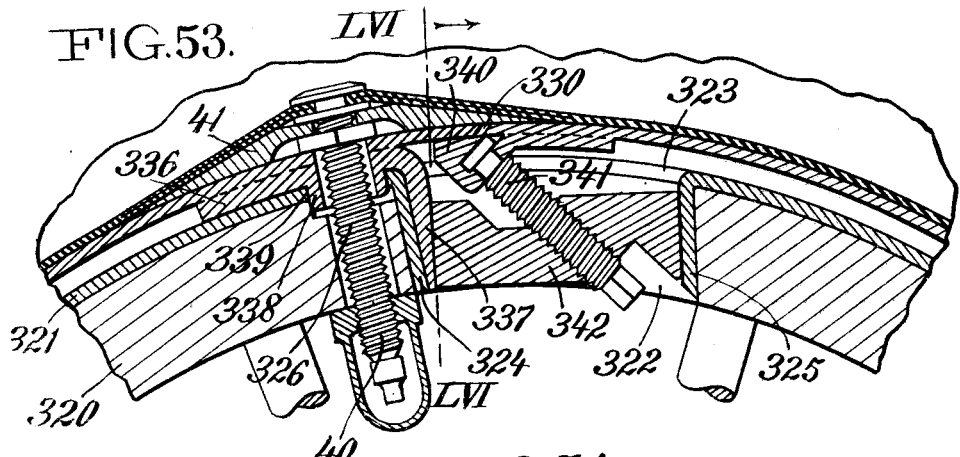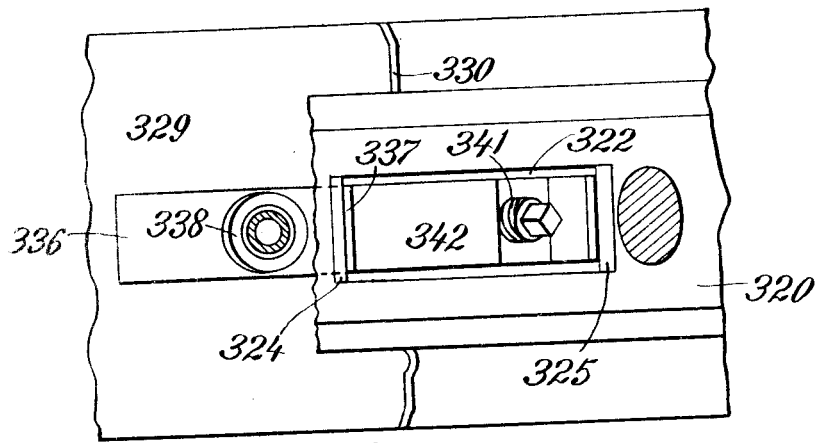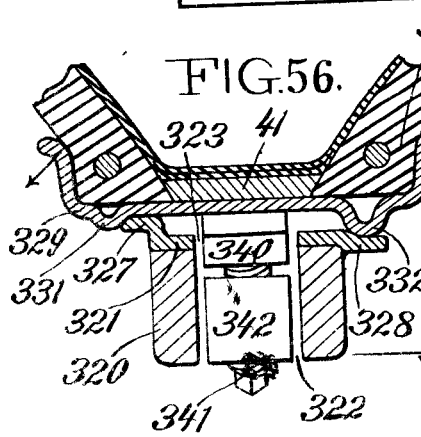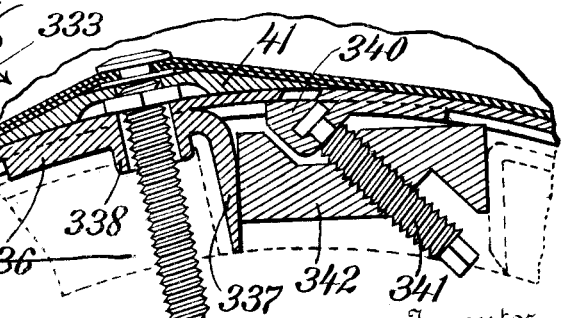

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,201,119.     Specification of Letters Patent.     Patented Oct. 10, 1916.

Application filed September 28, 1912. Serial No. 722,779.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates to improvements in vehicle wheel rims of the class designed to carry pneumatic or other resilient tires.

It relates particularly to what are known as demountable rims, in which a removable tire-carrying rim is provided which may be quickly attached to or detached from the wheel while carrying the resilient tire. With such structures it is possible to remove a tire-carrying rim with a pneumatic tire thereon from a wheel and replace it quickly and easily with a duplicate rim carrying an already inflated pneumatic tire.

It has heretofore been proposed to utilize a transversely split tire-carrying rim which may be placed upon the wheel periphery by being expanded in diameter, so as to slip freely thereover and then locked upon the wheel by being contracted thereon.

My present invention provides improved means for operating a transversely split rim in this manner, in the preferred forms of my invention the means being capable of expanding the rim prior to its application to the wheel, contracting the rim upon the wheel, or holding it contracted after it has been clamped upon the wheel by the pressure of the air in the tire, and expanding the rim while on the wheel to permit its removal therefrom, the means being of such nature that the expanded rim can be removed from the wheel and its ends then readily separated to facilitate the application of the tire to or its removal from the tire-carrying rim. In accordance with my invention also, the means provided for holding the rim contracted upon the wheel are preferably of such a nature that the ends of the split rim are positively locked to portions of the wheel itself, so that the tension in the rim is transmitted directly to the wheel. It will thus be seen that auxiliary connecting means, such as screws and the like, which have heretofore been proposed for holding the ends of the rim together, are not relied upon to withstand the tension in the rim when the wheel is in rapid rotation.

While it is preferable that all the features above enumerated be present in a structure in order to secure all the benefits of my invention, it is not essential that a construction, in order to possess some of the advantages thereof, need have all of such capabilities. I therefore do not intend to limit my invention solely to structures in which all of said features are present.

My invention also contemplates certain improvements in details of the tire-carrying rim and wheel structures, the nature of which will appear from the following description.

In the accompanying drawings which form a part of this specification, Figure 1 is a circumferential vertical section through a portion of a wheel felly, felly band and tire-carrying rim illustrating a preferred embodiment of my invention, the locking device being shown in position to hold the rim contracted upon the wheel; Fig. 2 is a transverse section of the structure shown in Fig. 1, the wedge being drawn down and turned part way around; Fig. 3 is a plan view of the under-side of the structure shown in Figs. 1 and 2, the dust-cap being removed, and the wedge being shown in the position which is occupies in Fig. 1; Fig. 4 is a transverse section through the felly, felly band and tire-carrying rim shown in Figs. 1 and 2, the section being taken at a point removed from the valve stem and locking device, and the tire-carrying rim being shown expanded to permit its application to or removal from the wheel; Fig. 5 is a view similar to Fig. 1, showing the tire-carrying rim expanded and removed from the wheel, and illustrating a clip which may be employed to connect the free end of the rim with the locking wedge, whereby the latter may be utilized to disconnect the ends of the rim base, as illustrated in dotted lines; Fig. 6 is a view similar to Fig. 1, showing a modified form of my invention; Fig. 7 is a transverse sectional view of the structure shown in Fig. 6; Fig. 8 is a plan view of the under-side of the structure shown in Fig. 6, the dust-cap being removed; Fig. 9 is a view similar to Fig. 6, the wedge having been reversed and operated to expand the rim; Fig. 10 is a view showing the expanded rim after it has been removed from the wheel; Fig. 11 is a view similar to Fig. 1, showing another modification of my invention; Fig. 12 is a plan view of the under-side of the structure shown in Fig. 11, the dust-cap being removed; Fig. 13 is a view similar to Fig. 11 showing the wedge reversed and inserted in position to expand the rim when the wedge is screwed up; Fig. 14 is a view showing the wedge operated to expand the rim, the latter having been removed from the wheel; Figs. 15 and 16 are perspective views of the stud carried by the rim and of the locking wedge, respectively; Fig. 17 is a view similar to Fig. 1, illustrating another modification of my invention; Fig. 18 is a transverse sectional view of the structure shown in Fig. 17; Fig. 19 is a plan view of the under-side of the structure shown in Fig. 17, the dust-cap being removed; Fig. 20 is a view of the rim expanded and removed from the wheel, the position of the wheel before removal being indicated in dotted lines; Figs. 21 and 22 are perspective views of the stud carried by the end of the rim and of the locking wedge, respectively; Fig. 23 is a view similar to Fig. 1, illustrating another modification of my invention, this modification being shown as applied to a wheel having a metallic felly and wire spokes; Fig. 24 is a transverse sectional view of the structure shown in Fig. 23; Fig. 25 is a view of the rim expanded and removed from the wheel, the position of the wheel felly before removal being indicated in dotted lines; Fig. 26 is a plan view of the under-side of the structure shown in Fig. 23, the dust-cap being removed; Fig. 27 is a view similar to Fig. 1 of another modification of my invention; Fig. 28 is a view of the rim shown in Fig. 27 expanded and removed from the wheel; Fig. 29 is a view similar to Fig. 1, showing another modification of my invention; Fig. 30 is a transverse sectional view of the structure shown in Fig. 29; Fig. 31 is a plan view of the under-side of the structure shown in Fig. 29, the dust-cap being removed; Fig. 32 is a view showing the rim expanded and removed from the wheel, the position of the wheel before removal being indicated in dotted lines; Fig. 33 is a view of the rim removed from the wheel, the rim being shown contracted as it will appear after a tire has been mounted thereon and prior to its expansion by the locking wedge; Fig. 34 is a perspective view of the locking wedge; Fig. 35 is a circumferential vertical sectional view of a portion of the wheel felly, felly band and box showing one of the guide-ways in the side of the box; Fig. 36 is a view similar to Fig. 1, illustrating another modification of my invention; Fig. 37 is a transverse sectional view of the structure shown in Fig. 36; Fig. 38 is a plan view of the under-side of the structure shown in Fig. 36, the dust-cap being removed; Fig. 39 is a view showing the rim expanded and removed from the wheel, the position of the wheel before removal being indicated in dotted lines; Fig. 40 is a side elevation of a portion of the wheel with the tire-carrying rim mounted thereon, showing the structure of the tire-carrying rim at the point where the same is split, portions of the rim base being broken away to show the connections of the ends of the split flange to the rim base; Fig. 41 is a view similar to Fig. 1, illustrating another modification of my invention; Fig. 42 is a view showing the rim of Fig. 41 expanded and removed from the wheel; Fig. 43 is a plan view of the under-side of the structure shown in Fig. 41; Fig. 44 is a perspective view of the wedge-block; Fig. 45 is a view similar to Fig. 1, illustrating another modification of my invention; Fig. 46 is a view showing the rim of Fig. 45 expanded and removed from the wheel, the position of the wheel before removal being indicated in dotted lines; Fig. 47 is a view similar to Fig. 1, illustrating another modification of my invention; Fig. 48 is a transverse section on the line XLVIII—XLVIII of Fig. 47; Fig. 49 is a plan view of the under-side of the structure shown in Fig. 47, the dust-cap being removed; Fig. 50 is a view showing the rim expanded and removed from the wheel; Fig. 51 is a view showing the rim removed from the wheel after it has been permitted to contract, the wedge-block being detached from the free end of the rim; the wedge-block is shown in dotted lines rotated into such position that it may be utilized to disconnect the ends of the rim; Fig. 52 is a perspective view of the wedge-block; Fig. 53 is a view similar to Fig 1, illustrating another modification of my invention; Fig. 54 is a plan view of the under-side of the structure shown in Fig. 53, a portion of the wheel felly and felly band being broken away; Fig. 55 is a view showing the rim expanded and removed from the wheel, the position of the wheel before removal being indicated in dotted lines; Fig. 56 is a transverse sectional view on the line LVI—LVI of Fig. 53.

Referring to the drawings in detail, and particularly to Figs. 1 to 5, inclusive, the numeral 1 designates the wooden felly of a wheel of ordinary type. Permanently mounted upon this felly, by shrinking or otherwise, is a metallic felly band 2 which has at one side thereof a raised flange provided with a seat 3, and at the other side thereof a depressed portion provided with a seat 4. 5 is the tire-carrying rim which is removably mounted upon the felly band 2. This rim may be of any suitable construction capable of expansion and contraction, but preferably comprises a rim base 6 transversely split as indicated at 7 in Figs. 1 and 3, the rim base being provided with endless reversible tire-retaining flanges 8. The rim base is provided with integral side flanges for engaging the tire-retaining flanges, these side flanges comprising the outwardly flared portions 9 and the inwardly hooked edges 10. When a pneumatic tire is mounted upon the rim and inflated, it forces the tire-retaining flanges apart and thus causes their edges to ride up the inclined faces of the flange portions 9, this action causing the rim base to be contracted with great force. If the rim base is mounted upon a wheel at the time it will be contracted and forcibly clamped thereupon. The hooked edge portions 10 of the side flanges engage the inclined surfaces of the dovetail-shaped bases 11 of the tire-retaining flanges 8 and thus prevent the flanges 8 from stretching or slipping over the side flanges on the rim base under the great stresses to which the flanges are subjected. Fig. 2 shows the rim base contracted upon the felly band of the wheel by the pressure of the tire against the endless tire-retaining flanges and directly upon the rim base, while Fig. 4 shows the rim base expanded. In order to permit the expansion of the rim base within the endless flanges, as shown in Fig. 4, I preferably depress side portions 12 of the rim base to provide annular channels. When a rim base of this form is contracted, it will be seen that its outer surface 13, upon which seat the toes of the tire-casing, is approximately level with the inner surfaces 14 of the tire-retaining flanges. The surface of the rim base and the clencher grooves in the tire-retaining flanges thus combine to form a hook-shaped recess of the proper configuration to receive the beads of the tire-casing. The tire is better supported with such a structure than where the rim base is made flat from side to side, the side flanges being turned up at the edges of such flat or rather cylindrical portions, as in such a structure the tire-retaining flanges stand away from the tire-seating surface of the rim base when the latter is contracted upon the wheel. By depressing the portions 12 at the sides of the rim base, a shoulder 15 is provided which is adapted to engage the raised flange at the side of the felly band, and thus when the rim is seated upon the felly band prevent lateral movement of the same in one direction. At the other side of the rim base a rib 16 is preferably rolled to form a seat adapted to engage the seat 4 at the corresponding side of the rim base. This rib 16 engages the shoulder 17 on the felly band and thus prevents lateral movement of the rim in the opposite direction. It will be seen that the bearing surfaces 3 and 4 at the two sides of the felly band and the corresponding bearing surfaces upon the rim are of different diameters, thus facilitating the removal of the rim from the wheel and permitting the valve-stem and locking devices to be "buttonholed" into their recess in the wheel with a minimum of clearance between the rim and felly band. The felly has a radial opening 18 formed therein, the end walls of which are preferably protected or reinforced by the inwardly turned portions 19 and 20 of the metallic felly band which are punched out to form the opening 21 through the latter, which registers with the opening 18. The lower portions of the end walls of the opening 18 are preferably beveled, as indicated at 22 and 23, for a purpose to be hereinafter described, the ends of the portions 19 and 20 being similarly beveled, as indicated at 24 and 25. The operating or locking devices for expanding and contracting the rim pass through the registering openings 18 and 21, the valve-stem of the tire being preferably, but not necessarily, also passed through this opening.

For expanding the rim and holding it expanded while it is being removed from or placed upon the wheel, and for holding the rim contracted and locked upon the wheel, I provide upon one end of the rim base an abutment, and upon the other end of the rim base a wedging device adapted to coact with said abutment to expand the rim and hold it expanded, the wedging device being also capable of coacting with a fixed portion of the wheel to hold the rim contracted when mounted upon the wheel. In the form of my invention shown in Figs. 1 to 5, inclusive, the means used for this purpose comprise a plate 30 permanently attached to the end of the rim base at one side of the split therein, a portion of this plate preferably projecting across the split and under the opposite end of the rim base, so as to hold the ends in alinement. The end portion of the plate 30 is bent down to form an abutment 31 adapted to seat against the downwardly bent portion 19 of the felly band. The abutment 31 has a beveled face 32 preferably alining with the beveled surfaces 22 and 24 when the abutment is against the portion 19. Upon the opposite end of the rim base I journal a radially disposed externally threaded stud 33. The stud may be secured to the end of the rim in any suitable manner which will permit of its rotation; for example, as shown in the present modification, the end of the rim base has an opening formed therethrough, the metal surrounding which is bent to form a flange 34, so as to give a depth of bearing for the stud. The end of the stud is journaled in this opening, a bushing 35 of bronze, or other material which will not rust, preferably being inserted between the end of the stud and the flange. The stud has a collar 36 located under the rim base and is riveted over at 37 on the outside of the rim base. The inner end of the stud is formed into a hexagonal or other suitable shape for engagement by a wrench, as indicated at 38. It is preferable to locate the valve-stem of the tire at this point, although this is not essential. It can be very readily accomplished, however, by making the stud 33 tubular and passing the valve stem through the central opening 39 in the stud. The valve-stem 40 carries the usual clip 41, and is preferably located so close to the split in the rim base that this clip will bridge the split 7 therein. The valve-stem dust-cap 42 may be advantageously used to carry a dust-cover 43 which will close the entire opening through the wheel felly and exclude dirt from the locking mechanism. The dust-cap is rotatably mounted in the cover 43 so that the latter may remain stationary while the cap is screwed upon the valve-stem. Mounted on the stud 33 is a wedge nut or block 44. In the operation of the device this block is adapted to be held against rotation in the slot in the wheel felly and be moved and guided radially upon the stud in one direction or the other, depending upon the direction of rotation of the stud. This block has a wedge face 45 which is adapted to engage with the beveled surfaces at either end of the hole through the wheel felly. It will be seen that when the stud is rotated to screw the block down below the surface of the wheel felly, as indicated in dotted lines in Fig. 1, it may be rotated into the opposite position. It is shown partly rotated in Fig. 2.

In the operation of this form of my invention, the tire-carrying rim being removed from the wheel, the rim base is collapsed, its ends being overlapped, and one of the endless flanges 8 is removed. A tire is then placed upon the rim base and the flange 8 replaced, and the ends of the rim base brought into alinement. The rim base, however, will be held in contracted position owing to the elasticity of the tire. The wedge block 44 is then turned to bring its wedge face 45 into engagement with the beveled face 32 of the abutment 31. The stud 33 is then rotated to screw the wedge-block toward the under-side of the rim base, thus expanding the latter until the parts are in the position shown in Fig. 5. It will be seen that the screwing up of the wedge-block, in this manner, to expand the rim, has no tendency to force the ends of the rim base out of alinement, as it draws the end of the rim base carrying the stud 33 against the projecting portion of the plate 30. When the block has been screwed up so as to expand the rim, it holds the same firmly in expanded position and the tire may be inflated. If preferred, the tire may be inflated after the ends of the rim base have been brought into alinement and before the rim base has been expanded by screwing up the wedge-block. The rim with the inflated tire thereon may be carried upon the vehicle as long as may be desired or until an emergency arises, when it is ready for immediate application to the vehicle wheel. To accomplish this, it is slipped over the vehicle wheel while expanded, as shown in Figs. 4 and 5, the valve-stem, stud 33, block 44 and abutment 31 being "button-holed" into the opening 18 in the wheel felly. In order to prevent circumferential movement of the end of the rim carrying the plate 30 upon the wheel, I preferably provide a lug 46 projecting inwardly from the plate and adapted to be received in a recess 47 formed in the felly band. This lug will enter its recess at the same time that the stud, wedge-block and abutment 31 enter the hole 18. To contract the rim upon its seat on the felly band, the stud 33 is rotated by means of a suitable wrench, so as to draw the wedge block 44 radially inward toward the center of the wheel. Owing to the great pressure of the tire exerted in forcing the endless flanges 8 apart, and thus causing them to slide up the outwardly flared portions 9 of the side flanges of the rim base, and also to the pressure of the tire radially inward upon the rim base, the latter is forcibly contracted upon its seat. In order to supplement this action, if necessary, and positively to lock the rim base upon its seat, so that it cannot expand, even if the tire becomes accidentally deflated, the wedge-block, when it has been moved below the felly, is reversed and then screwed up. This brings its wedge face 45 into contact with the inclined faces 23 and 25, which are fixed with relation to the wheel and thus cause the wedge-block to force the stud and the end of the rim base which carries the same toward the abutment 31. The rim base is thus positively contracted and maintained in such position and is firmly locked upon the wheel as shown in Fig. 1. The dust-cap and cover are now applied and the wheel is ready for use. To remove the rim and tire, the wedge-block is screwed down by the rotation of the stud, its position is reversed to that shown in dotted lines in Fig. 1, and it is then screwed up until its wedge face 45 engages the inclined surfaces 22, 24 and 32. The wedge-block slides along these faces, forcing the stud 33 and the end of the rim base to which it is attached away from the abutment 31 and expanding the rim base, the wedge face 45 eventually leaving entirely the faces 22 and 24 and engaging only with the face 32. It is then possible to swing the rim clear of the wheel felly diametrically opposite to the valve-stem, and then lift the stud, valve-stem, wedge-block and abutment 31 out of the opening 18 in the felly. A duplicate rim carrying an inflated tire may then be applied to the wheel in the manner described.

The end walls of the opening 18 are preferably recessed or beveled off considerably, as shown, so as to permit the abutment 31 to be made short, and so as to have the wedge 44 act as near to the under-side of the rim as possible. The leverage of the stud upon its bearing in the rim base is thus reduced to a minimum.

The rim having been expanded and removed from the wheel, the parts occupy the relative positions shown in Fig. 5. In order to remove the tire from the rim, the ends of the latter must be separated so that they may be telescoped and one of the flanges 8 and the tire removed. The ends of the rim may be separated in any suitable manner, as by means of a screw-driver inserted between the endless flange and the rim base, or by the use of any of the well-known forms of operating tools adapted to the purpose. I prefer, however, to take advantage of the presence of the movable wedge-block and stud 33 to separate the ends of the rim base. For this purpose, I provide means for temporarily connecting the wedge-block 44 to the abutment 31, so that upon screwing down the wedge-block, the end of the rim base to which the plate 30 carrying the abutment is attached will be drawn down out of alinement with the opposite end of the rim base. I have shown in Fig. 5 a simple arrangement for accomplishing this result. As illustrated, the abutment 31 has a hole 48 formed therein adapted to receive one end of a hook-shaped clip 49. The other end of the clip 49 enters a socket 50 formed in the under-side of the wedge-block 44. It will be seen that when the clip is applied as shown in Fig. 5 it will cause the abutment 31 and the end of the rim base to be drawn down when the wedge block 44 is screwed down upon the stud 33, thus separating the ends of the rim base, as indicated in dotted lines in Fig. 5. When the ends of the rim base are thus separated it is an easy matter to insert a tool such as a screw-driver between the rim base and one of the flanges 8 and thus hold the end of the rim base down while the clip 49 is removed. The end of the rim base may then readily be pried laterally out of alinement with the opposite end of the rim base and the latter may be collapsed sufficiently to permit the endless flange and tire to be removed.

In Figs. 6 to 10, inclusive, I have illustrated a modification of my invention in which the structure differs in many points from that of the modification shown in Figs. 1 to 5, inclusive, but in which the operation is essentially the same. As shown in these figures, the felly 60 of the wheel has a felly band 61 mounted thereon, this felly band having welded into it at one point a rectangular box 62 preferably extending the entire width thereof. This box has a rectangular opening 63 extending radially therethrough. The felly has a piece cut out of it to provide a space for this box, the ends of the felly abutting against its end walls 64. The side walls 65 of the box complete the felly band and make the same an endless ring, so that it can be shrunk on the felly. The felly band is preferably provided with annular seats 66 and 67 of different diameters corresponding to the seats 3 and 4 of the felly band 2 above described. 68 is the tire-carrying rim which is shown in this instance for purposes of illustration as comprising a one-piece clencher rim transversely spilt as indicated at 69. The rim preferably has a rib 70 rolled therein adapted to engage the seat 67 on the felly band, and a second and smaller rib 71 rolled near its other side adapted to over-hang the flange at that side of the felly band in order to prevent lateral movement of the rim. One end of the rim carries a plate 72, a portion of which projects under the opposite end of the rim, the end portion of the plate being bent down to form an abutment 73. This end of the rim is also preferably provided with a lug 46 adapted to enter a recess 47 in the felly band. The opposite end of the rim has fixed thereto a stud 74 which has an opening 75 therein through which passes the valve-stem 40 of the tire, and also has an internally screw-threaded socket 76 formed therein. Into this socket screws a cap-screw 77 having a cylindrical neck 78 and an enlarged hexagonal or otherwise suitably shaped head 79. Rotatably mounted upon the neck 78 is a wedge 80. The latter has a vertical face 81 adapted to engage the side of the stud 74 and has an inclined wedge face 82 adapted to engage the beveled face 83 of one of the end walls 64 of the box 62 when the wedge is used to contract the rim upon the wheel and to hold it contracted during the operation of the wheel. When the wedge is reversed its wedge face 82 engages the beveled face 84 formed on the abutment 73, the wedge when screwed up in engagement with this face serving to expand the rim and hold the same expanded while it is being applied to or removed from the wheel. The stud 74 is preferably square in section, as the flat faces thereof give better support to the wedge 80, but this configuration is not essential. A suitable dust-cover 43 is preferably provided to exclude dirt from the opening 63 through the box. Fig. 6 shows the rim contracted upon the wheel and held in contracted position by the wedge 80, Fig. 7 shows the cap-screw 77 and the wedge 80 screwed down so as to permit the wedge to be reversed, this figure showing the wedge turned partly around. Fig. 9 shows the rim still mounted upon the wheel, the wedge 80 having been forced between the stud 74 and the abutment 73, so as to expand the rim. Fig. 10 shows the rim removed from the wheel and held expanded by the wedge.

In Figs. 11 to 16, inclusive, I have illustrated another modification of my invention. In accordance with this modification the wheel felly 90 has a felly band 91 shrunk thereon, the felly band having a box 92 formed as an integral part thereof. 93 is the rim which is transversely split at 94 and which has attached to one end thereof the plate 95 having the bent-over end forming an abutment 96 adapted to seat against one of the end walls of the box 92. 97 is a stud secured to the opposite end of the rim and having a hole therethrough for the valve-stem and a screw-threaded socket 98. The stud is provided with converging wedge faces 99. A cap-screw 100 screws into the socket 98 and is provided with a cylindrical neck 101 and with an enlarged hexagonal or otherwise suitably shaped head 102. Mounted on the neck 101 of the stud and supported by the head 102 is a wedge member 103. The shape of this wedge member is shown in Fig. 16, it being provided with a beveled wedge face 104 adapted to engage one of the wedge faces 99 on the stud. It has a pair of arms 105 which rest upon the head 102 of the cap-screw and between which slides the neck portion 101 of the screw. The ends of the arms 105, after the neck of the cap-screw has been passed between them, are preferably bent over slightly, as shown in dotted lines in Fig. 12. so as to prevent the separation of the wedge from the cap-screw. The wedge is preferably formed with a recess 106 therein which is adapted to receive the cylindrical portion of the stud 97 and thus permit the wedge to be moved close to the stud. This provides a comparatively long travel of the wedge face 104 along a wedge face 99 of the stud, and also a large area of contact between said faces. To expand the rim, the wedge 103 is inserted between the abutment 96 and the adjacent wedge face 99 of the stud, as shown in Fig. 13. Upon screwing up the cap-screw, it will be seen that the wedge face 104 slides along the wedge face 99 and forces the stud 97 away from the abutment 96, thus expanding the rim into the position shown in Fig. 14. It will be seen that the arms 105 must have an elongated slot formed between them in order to permit the relative movement which takes place between the wedge and cap-screw. The rim, being in the expanded position shown in Fig. 14, is applied to the wheel as in the forms of my invention already described. The cap-screw is then screwed out of its socket in the stud 97 and the wedge inserted between the other beveled face 99 of the stud 97 and the adjacent end wall of the box 92. The wedge is then drawn up by screwing up the cap-screw and is forced between the wedge faces 99 and the end of the box, thus contracting the rim and serving positively to hold it contracted. This position of the parts is illustrated in Fig. 11.

In Figs. 17 to 22, inclusive, I have illustrated another modification of my invention similar in operation and in some respects similar in structure to the modification last described. In accordance with this form of my invention, the felly 110 has a felly band 111 mounted thereon, the felly band having formed as a part thereof the box 112. 113 is the rim which is shown as comprising the base 114 and the endless, reversible flanges 115, these parts being of the same cross section as the base and flanges shown in Figs. 2 and 4. Fig. 18 shows the flanges 115 placed upon the rim base in position to engage a straight-sided tire. The flanges 115 are endless, while the rim base 114 is transversely split as indicated at 116. One end of the rim base has a plate 117 attached thereto, the end of the plate being bent down to form an abutment 118 adapted to engaged one end wall of the box 112. The other end of the rim base carries a stud 119 which is firmly riveted or otherwise permanently attached thereto. This stud, which is shown in detail in Fig. 21, comprises a body portion having beveled wedge faces 120 and an externally screw-threaded portion 121. It is preferably made tubular to to permit the valve-stem of the tire to be passed therethrough. Screwing on the threaded portion 121 of the stud is a nut 122 having a hexagonal or otherwise suitably shaped head 123 and a cylindrical portion or neck 124 of reduced diameter. Upon the inner end of the neck is formed a collar 125. Slidably and rotatably mounted upon the nut between the collar 125 and the head 123 is a wedge member 126. The latter is of U-shaped section, the base portion including the two arms 127 which slide upon the nut. A recess 128 is formed in the member for the reception of the collar 125. The member is provided with a pair of wedge faces 129 which engage one or the other of the wedge faces 120 upon the stud. The operation of the wedge member 126 in this modification of my invention is the same as the operation of the wedge member 103 shown in Figs. 11 to 16. Fig. 17 shows the wedge member forced between one of the beveled faces 120 and the end wall of the box 112 and acting to hold the rim contracted upon the wheel. Fig. 20 shows the wedge member reversed and forced between the abutment 118 on one end of the rim and one of the wedge faces 120 upon the stud 119 upon the other end of the rim, thus holding the rim expanded. Owing to the shape of the wedge member, it is possible to rotate the same from one position to the other without entirely withdrawing it from its opening through the wheel and without entirely unscrewing the nut 122 from the threaded portion 121 of the stud. Fig. 18 shows the wedge member being reversed in this manner.

In Figs. 23 to 26, inclusive, I have shown another modification of my invention, in which the operation of the device as a whole is similar to that of the forms of my invention previously described. The operation of the movable wedge member which expands and contracts the rim, however, is different in that such member does not have to be reversed in position to accomplish the expansion and contraction, but such operations are performed simply by a reversal in the direction of movement of the wedge member. For purposes of illustration I have shown this modification of my invention as applied to a wheel having wire spokes 130 and a metallic fixed rim 131. It will be understood, however, that this modification may be applied to a wooden wheel in a manner similar to that shown in the figures illustrating wooden wheel constructions, and also that the modifications of my invention which are shown applied to wooden wheels are capable of being applied to metallic wheels after the manner illustrated in Figs. 23 to 26. In the construction here shown the metallic fixed rim 131 is of channel-shaped section, the flanges 132 and 133 of which are outwardly turned and are of different heights, so as to provide bearing surfaces 134 and 135 of different diameters. The fixed rim 136 seats upon these bearing surfaces and comprises a rim base 137 transversely split at 138 and carrying the endless reversible tire-retaining flanges 139. It will be understood of course that a fixed rim of any other suitable section, either with or without endless flanges, may be substituted for the type of rim shown. The channeled fixed rim 131 has a hole 140 punched in the bottom thereof, the metal at the ends of the hole being bent up into the channel to form abutments 141 and 142. One end of the rim base 137 carries a plate 143 which extends under the opposite end of the rim base, the end of the plate being bent down to form an abutment 144. This abutment 144 is adapted to engage the abutment 141 formed on the wheel, and its end is beveled as indicated at 145. The lower portion of the abutment 141 is preferably similarly beveled as indicated at 146. The other end of the rim base has rotatably secured to it in any suitable manner an externally screw-threaded tubular stud 147. The valve-stem of the tire is adapted to pass through this stud. The stud has a head 148 shaped for engagement by a wrench. The stud may be secured to the end of the rim base in any suitable manner, for example, as illustrated in Fig. 1. I have shown, however, a modified connection between the stud and the rim base consisting of a plate 149 having a recess therein in which is received a collar 150 formed on the stud. The plate 149 is welded or riveted to the under-side of the rim base and clamps the collar against the rim base. Screwing upon the stud 147 is a double-ended nut or wedge-block 151. This block has parallel inclined wedge faces 152 and 153 formed upon its ends. The wedge face 152 is adapted to engage the beveled face 146 on the fixed rim and the beveled face 145 of the abutment 144. The wedge face 153 of the block engages the beveled face 154 of the abutment 142 on the fixed rim. The operation of this form of my invention will be clear from an examination of Figs. 23 and 25. The expanding of the detachable rim is accomplished by screwing the wedge block toward the under-side of the rim base, thus causing the wedge face 152 to slide along the wedge face 145 and force the abutment 144 away from the stud 147. Fig. 25 shows the detachable rim expanded in this manner. The rim is now ready to be applied to the wheel. When so applied the abutment 144 engages the abutment 141 and the wedge face 153 on the wedge-block rests upon the inclined face 154 of the abutment 142, as shown in dotted lines in Fig. 25. The stud 147 is now rotated to screw the block 151 away from the rim base. This releases the pressure upon the abutment 144 and permits the rim base to contract. At the same time the wedge face 153 slides along the wedge face 154 and forces the stud 147 toward the abutment 144, thus positively contracting the detachable rim, and when the wedge-block reaches the position shown in Fig. 23, firmly holding the rim contracted upon the wheel. When the parts are in this position the wheel is ready for operation. It will be seen that the block 151 substantially fills the opening 140 in the fixed rim and thus acts to exclude dirt from such opening so that no dust-cover is necessary for this purpose. A simple dust-cap 155 to protect the end of the valve-stem is all that is necessary.

In Figs. 27 and 28 I show another modification of my invention, the operation of which is similar to that of the modification shown in Figs. 23 to 26. According to this form the wheel felly 160 is provided with a metallic felly band 161 carrying a box 162 which is received between the adjacent ends of the wooden felly. One end wall 163, of the box is provided with a beveled face 164 for a purpose which will be hereinafter described. 165 is the rim which is transversely split at 166. The rim carries at one end a plate 167, the end of which is bent down to form the abutment 168, which rests against the end wall of the box when the rim is mounted upon the wheel. This end of the rim may, if desired be provided with a lug 46 entering a recess 47 in the felly band to prevent circumferential movement of this end of the rim with relation to the wheel. The other end of the rim carries a stud 169 which has an opening therethrough for the valve-stem of the tire and has an internally screw-threaded socket 170 therein. A cap-screw 171 screws into this socket, the cap-screw having a cylindrical neck 172 and a head 173 suitably shaped for engagement by a wrench. Mounted upon the neck portion 172 of the cap-screw and supported by the head 173 is a double wedge member 174. This member comprises a wedge portion 175 having a vertical face 176 adapted to engage a wall of the stud 169 and having a beveled wedge face 177 adapted to engage the beveled face 178 formed upon the abutment 168. The wedge member 174 also has a wedge 179 which has a beveled wedge face 180 preferably substantially parallel to the beveled wedge face 177. This face 180 is adapted to engage the beveled portion 164 of the wall 163 of the box carried by the wheel felly. It will be seen that screwing up the cap-screw 171 will cause the wedge face 177 to engage the wedge face 178 of the abutment 168 and thus expand the rim. The rim is shown expanded and removed from the wheel in Fig. 28. After the expanded rim has been applied to the wheel the cap-screw 171 is screwed partly out of its socket, thus drawing the wedge member away from the rim base. This permits the rim to contract under the pressure of the tire and causes the wedge face 180 to slide along the wedge face 164, thus supplementing the pressure of the tire in contracting the rim and also locking the rim positively in contracted position. This supplemental positive contractive action of the locking device in this and the other modifications of my invention is sometimes important, as where a rim has been expanded within a tire and left standing for a considerable period, the tire sometimes adheres tightly or "freezes" to the rim, so that even when the means holding the rim expanded is released, the tire will not automatically contract. By screwing up the wedge means, however, the rim can be positively contracted, and as soon as its adhesion to the tire is broken, it will be forcibly contracted by the pressure of the tire, as already described. This "freezing" of the tire to the rim is particularly likely to have the effect described when the rim is of the one-piece clencher type without endless flanges, as shown in Fig. 7.

In Figs. 29 to 35, inclusive, I have shown a modification of my invention in which one end of the rim carries a movable block which slides in inclined guides on the wheel, thereby expanding and contracting the rim. As shown in these figures, 190 is the felly upon which is mounted the metallic felly band 191 which has formed as a part thereof the box 192 fitting between the ends of the wooden portion of the felly. The box has an opening 193 extending therethrough in a radial direction, the side walls of the box having inclined guide-ways 194 formed therein. 195 is the removable tire-carrying rim which comprises the endless reversible tire-retaining flanges 196 and the rim base 197, the latter being transversely split, as indicated at 198. The rim base shown has a groove 199 formed near one side thereof in which is received a flange 200 formed upon the corresponding side of the felly band 191. Near the other side the rim base has a rib 201 rolled therein which seats in a channel formed in a flange 202 at the corresponding side of the felly band. By this construction, when the rim base is contracted upon the felly band, the rim is positively held against lateral displacement in either direction. It will be understood that a rim section of any other suitable form may be used if desired. One end of the rim base carries a plate 203, the end of which is bent down to form an abutment 204 seating against one end wall of the box 192. This end of the rim is anchored against circumferential movement upon the wheel in any suitable manner, as by means of a lug 46 received in a recess 47 in the felly band. The other end of the rim base carries an externally threaded rotatable tubular stud 205. The latter may be journaled in the rim base in any suitable manner, for example, the stud shown is provided with a collar 206 which engages the under-side of the rim base, a bushing 207 of bronze or other suitable material being inserted between the stud and the walls of the hole in the rim base, and resting upon the collar. The end of the stud is then riveted over as indicated at 208. By using the bushing 207 it is possible to rivet the stud down solidly upon the same, the stud and bushing rotating in the hole through the rim base. If the stud were riveted directly to the rim base, it would not be possible to rivet the end of the same down tightly, as that would prevent the free rotation of the stud. Moreover, by using a bushing of bronze or other similar material, the danger of the stud rusting to the rim base is eliminated. The stud 205 carries a wedge-block 209 which has lugs 210 projecting from its sides and sliding in the guideways 194. The lugs 210 preferably have parallel inclined guiding faces 211 which slide between the parallel inclined guide walls of the guide-ways 194. The wedge-block 209 also has a beveled wedging surface 212 which is adapted to engage the beveled surface 213 of the abutment 204 and thus hold the rim expanded when it is removed from the wheel. The wedging surface 212 is also used to expand the rim before it is applied to the wheel. The actual expansion and contraction of the rim when on the wheel are, however, accomplished by the engagement of the lugs 210 in the guide-ways 194. Portions of one of the walls of each guide-way and of the lugs 210 are cut away as indicated at 214 and 215, respectively, in order to permit the lugs to enter and leave the guide-ways when the rim is applied to or removed from the wheel.

In the operation of my device, the rim while removed from the wheel is collapsed sufficiently to permit the tire to be placed thereon, as has been already described. The ends of the rim are then brought into alinement, the rim base being contracted, as shown in Fig. 33. The wedge-block 209 is then screwed up to bring its face 212 into contact with the face 213 of the abutment 204, as shown in this figure. Further screwing up of the wedge block will expand the rim until the parts occupy the position shown in Fig. 32. The rim is then applied to the wheel, the lugs 210 entering the guideways 194, as shown in Figs. 32 and 35. The stud 205 is then rotated to draw the wedge-block away from the under-side of the rim base, thus causing the lugs 210 to slide in the inclined guide-ways 194 and thus force the block, stud 205, and the end of the rim base carrying the stud toward the end of the rim base which is anchored to the wheel. The rim is thus contracted upon the wheel and locked in the contracted position shown in Fig. 29. It will be seen that in this construction, as the block is guided between parallel guiding surfaces, substantially in line with the stud 205, the block 209 cannot tip, and thus there is no tendency to bend the stud. To remove the rim from the wheel, the block is screwed toward the under-side of the rim base while being still guided in the guide-ways 194, thus forcing the stud and its end of the rim base away from the anchored end of the rim base. The abutment 204 and the block 209 may, if desired, be provided with a hole 48 and a socket 50, respectively, for engagement with a clip 49 of the form shown in Fig. 5 in order to draw the ends of the rim out of alinement, as shown in that figure.

In Figs. 36 to 40, inclusive, I have shown another modification of my invention. As shown in these figures, 220 is the felly having the felly band 221 mounted thereon, the latter carrying the box 222 which separates the adjacent ends of the wooden portion of the felly and provides an opening 223 extending radially through the wheel. 224 is the tire-carrying rim which in this example of my invention is shown as comprising the rim base 225 transversely split as indicated at 226, and the reversible tire-retaining flanges 227, also transversely split as indicated at 228. As shown, the flanges are split at the same point at which the rim base is split, although this is not essential. The flanges may be secured to the rim base in any suitable manner. In the modification shown the flanges have dovetail-shaped bases 229 which interlock beneath the inwardly hooked flanges 230 formed along the edges of the rim base. The ends of the flanges are secured to the rim base by means of screw-threaded studs 231 passing through holes in the rim base, and engaged by nuts 232. Any other suitable means may be used for this purpose. The rim base seats at one side upon a raised flange 233 formed at one side of the felly band, a small rib 234 being formed in the rim base adjacent to such flange to prevent lateral movement of the rim base upon the felly band in one direction. At the other side the rim base is provided with a larger rib 235, which seats upon a seat 236 of less diameter than the seat on the flange 233. The seat 236 is preferably formed upon a flange 237 projecting laterally from the felly band. One end of the rim base has a plate 238 attached thereto, the end of the plate being bent down to form an abutment 239 adapted to seat against one end of the box 222 when the rim is mounted upon the wheel. The other end of the rim base has a rhomboidal stud or block 240 fixed thereto, this stud having an opening therethrough for the valve-stem of the tire and having an internally screw-threaded socket 241 therein. Screwing into this socket is a cap-screw 242 having a cylindrical neck 243 and a hexagonal or otherwise suitably shaped head 244. Mounted on the cap-screw is a wedge-block 245 which has an elongated opening 246 therein through which the cap-screw passes. A rhomboidal recess 247 is formed in this wedge block to permit the same to slide over the stud 240. It will be seen that the operation of the cap-screw forces the wedge-block toward or draws it away from the rim base. Owing to the engagement of the inclined walls of the rhomboidal stud with the inclined walls of the recess in the wedge-block, the latter will be guided in a path inclined to a radius, and thus its movement will have a circumferential component with relation to the rim. The ends of the wedge-block slide radially between the abutment 239 and the opposite end wall of the box 222, so that as the block is moved up and down upon the stud 240, the end of the rim to which the stud is attached will be moved circumferentially with relation to the wheel. Thus the rim will be expanded and contracted. Fig. 36 shows the wedge member drawn down and holding the rim positively contracted upon the wheel. Fig. 39 shows the wedge member forced toward the under side of the rim base and holding the rim expanded. It will be seen that by screwing up the wedge member into the position shown in Fig. 39, the rim may be expanded whether it is on or off the wheel.

In Figs. 41 to 44, inclusive, I have shown a modification of my invention in which the end of the rim carrying the operating devices remains stationary, the opposite end of the rim being moved back and forth to cause the necessary expansion and contraction. As shown in these figures, 250 is the felly having the felly band 251 mounted thereon. The felly has a radial opening 252 formed therethrough, the end walls of the opening being protected by the portions 253 of the felly band bent down into the opening. 254 is the removable tire-carrying rim which may be of any suitable configuration, and which is transversely split at 255. One end of the rim base carries the plate 256 which extends out beneath the other end of the rim, the end of the plate being bent down to form an abutment 257. The other end of the rim has journaled therein a stud 258 which is externally threaded and provided with a portion 259 of hexagonal or other suitable configuration adapted to be engaged by a wrench. The stud may be journaled in the end of the rim in any suitable manner, for example, the portion of the rim around the opening through which the end of the stud passes may be offset, as indicated at 260, the end of the stud being provided with a bushing 261 of bronze or other suitable material and riveted over upon the bushing as indicated at 262. The stud is preferably tubular to permit the valve-stem of the tire to be passed therethrough, although the valve-stem may be located at some other point in the circumference if desired. The wedge-block 263 screws upon the stud 258, the ends of the block being guided between the end walls of the opening through the felly when the rim is mounted upon the wheel. The block 263 is provided with a beveled wedging face 264 adapted to engage a beveled face 265 formed upon the abutment 257, so that when the wedge-block is forced toward the underside of the rim, it draws said abutment toward the stud 258 and thus contracts the rim. The block is shown holding the rim contracted in Fig. 41. The block 263 is provided with a second wedging face 266 adapted to engage a beveled face 267 formed upon the abutment 257, when the position of the block is reversed as shown in dotted lines in Fig. 41. When the block is screwed up in this reversed position it expands the rim as shown in Fig. 42. It will be seen that the block fitting the opening through the wheel felly holds the end of the rim carrying the stud stationary, and when operated moves the other end of the rim back and forth to cause the expansion and contraction of the rim, depending upon which of the faces 264 or 266 is brought into engagement with the abutment.

In Figs. 45 and 46 I show another modification of my invention in which the operation is similar to that of the modification shown in Figs. 41 to 44. That is, the end of the rim carrying the operating mechanism remains stationary, while the opposite end of the rim is moved back and forth to cause the expansion and contraction of the rim. As shown in Figs. 45 and 46, the wheel felly 270 has a felly band 271 mounted thereon, portions of the latter, 272 and 273, being bent down to protect the end walls of an opening 274 formed in the felly. The portion 272 is provided with a beveled face 275. 276 is the tire-carrying rim which is transversely split at 277. One end of the rim is provided with the extension portion 278 upon which rests the opposite end of the rim, the end of the extension portion being bent down to form an abutment 279. The end of the abutment preferably has beveled faces 280 and 281. The opposite end of the rim carries a block or stud 282 which has a screw-threaded socket 283 therein. The stud preferably has an opening therethrough for the valve-stem, although the valve-stem may be located elsewhere if desired. 284 is a cap-screw screwing into the socket 283, the cap-screw having a cylindrical neck portion 285 and a head 286 shaped for engagement by a wrench. Slidably and rotatably mounted upon the neck portion of the cap-screw and supported by the head thereof is a wedge member 287. The latter has arms 288 embracing the neck portion of the cap-screw, the construction being similar to that illustrated in Figs. 12 and 16. The wedge member has beveled wedging faces 289 and 290. The end of the stud 282 adjacent to the abutment 279 is provided with a beveled wedge face 291. To expand the rim the cap-screw is unscrewed sufficiently to permit the wedge member to slide freely back and forth thereon. The point of the wedge member is then inserted between the beveled face 281 of the abutment and the beveled face 291 of the stud 282. Upon screwing up the cap-screw the wedge member will be forced between these beveled faces and will thus expand the rim as shown in Fig. 46. The rim may then be mounted upon the wheel, the end of the stud 282 preferably engaging the wall 273 of the opening through the wheel. The cap-screw is then unscrewed, lowering the wedge member and permitting the rim to be contracted. The wedge member is then moved along the cap-screw until its point is between the face 275 of the felly band portion 272 and the beveled face 280 of the abutment 279. The cap-screw is then screwed up, forcing the wedge between these beveled faces, thus forcibly contracting the rim and locking it in contracted position. It will be seen that throughout the time that the rim is mounted upon the wheel the stud 282 is in engagement with the wall 273 and that the force applied both in expanding and contracting the rim urges the stud against such wall. Thus the stud and the end of the rim carrying the same remain stationary with relation to the wheel, while the opposite end of the rim is moved in one direction or the other to cause the expansion and contraction of the rim.

In Figs. 47 to 52, inclusive, I have shown a modification of my invention similar to the modifications shown in Figs. 41 to 44, and in Figs. 45 and 46, respectively, in that the end of the rim carrying the operating mechanism remains stationary while the opposite end of the rim is moved back and forth to cause the expansion and contraction, but differing from the modifications referred to, in that the movement of the wedge-block in one direction causes the rim to be expanded, and its movement in the opposite direction causes it to be contracted. In the previous modifications referred to, a preliminary adjustment of the wedge member is required to effect the expansion or contraction, as the case may be. Also, in both of these modifications, the action is obtained by moving the wedge member in the same direction for both the expansion and contraction. In Figs. 47 to 52, inclusive, 300 is the wheel felly, upon which is mounted a felly band 301 carrying a box 302, against which the end of the wooden felly abut. The felly band may be of any suitable configuration; for example, it may have an outwardly flaring flange 303 at one edge thereof and a slightly upturned flange 304 at the other edge thereof, as shown in Fig. 48. 305 is the tire-carrying rim which may be of any suitable configuration. As illustrated, it comprises the rim base 306 transversely split at 307 and carrying the endless reversible tire-retaining flanges 308. The rim base has rolled therein a low rib 309 which bears against the flange 303 on the felly band, and a deeper rib 310 which seats upon the flange 304 and within its outer upturned edge. It will be seen that the rim base when contracted upon the felly band is thus retained against lateral movement in either direction, and also that the bearing surfaces of the rim base upon the felly band at the two sides of the latter are of different diameters, thus facilitating the application and removal of the rim in a well understood manner. One end of the rim base is provided with an extension portion 311 which projects under the opposite end of the rim base, the end of the projecting portion being bent toward the center of the wheel and back under the rim base at an acute angle to form an inclined abutment 312. At the other end of the rim base there is a rotatable externally threaded stud 313 which is preferably made tubular to permit the valve-stem to be passed through the same, although it is not essential that the valve-stem be located at this point. Screwing on the stud 313 is a wedge-block 314, the ends of which slide between the end walls of the box 302. The block 314 has a diagonal slot 315 formed therein which is adapted to receive the inclined abutment 312. It will be seen that the end of the abutment having been inserted in the slot 315 and the wedge-block forced toward the under-side of the rim base, the latter will be expanded owing to the inclination of the slot and abutment. Fig. 50 shows the rim base as thus expanded. The expanded rim having been applied to the wheel, the stud 313 is rotated to screw the block 314 away from the under-side of the rim base and toward the center of the wheel. This will permit the rim base to be contracted by the pressure of the tire and will, if necessary, exert a positive contractive force upon the rim base. When the block is screwed down, as shown in Fig. 47, the rim base is locked in contracted position upon the felly band and the rim securely mounted upon the wheel. It will be seen that when the rim is mounted upon the wheel the block 314 sliding in the box will be held against circumferential movement, thus holding the stud 313 and the end of the rim base to which it is secured against movement circumferentially upon the wheel. The adjustment of the block 314 causes the other end of the rim base to be moved in expanding and contracting the rim. When the rim is to be removed, the block is forced toward the under-side of the rim so as to expand the same, and the rim when taken off is in the condition shown in Fig. 50. It will be seen that in this condition the engagement between the abutment 312 and the block 314 is such as to prevent the disengagement of the two ends of the rim base, as is necessary to permit the same to be collapsed and freed from the endless flanges and tire. In order to disengage the ends of the rim base, I screw the block 314 away from the rim base, thus permitting the rim base to contract, and finally disengaging the block altogether from the abutment, as shown in Fig. 51. The block may now be pivoted about the stud until its short end is under the abutment, which will permit the free end of the rim base to be brought down and swung laterally, so as to disengage it from the endless flanges.

I may, if desired, utilize the wedge-block to draw the end of the rim down in a manner similar to that illustrated in Fig. 5. For this purpose I form a notch 316 in the side of the abutment 312 and provide the short end of the block 311 with a lug 317. The lug is preferably at one corner of the block, the other corner of the short end being rounded off as indicated at 318. After the block 311 has been screwed down to disengage the abutment 312 from the slot 315, as shown in Fig. 54, it is swung partly around and then screwed up until the lug 317 is even with the notch 316. It is then swung farther around, thus causing the lug to enter the notch. This position is shown in dotted lines in Fig. 51. By rotating the stud 313, the wedge block may then be drawn away from the under-side of the rim base, carrying with it the abutment 312 and the end of the rim base to which it is attached. The ends of the rim base are thus drawn out of alinement and a suitable tool may be inserted between the end which is drawn down and one of the endless flanges, and the rim base be readily pried away from such flanges and collapsed sufficiently to permit the flanges and the tire to be removed.

In Figs. 55 to 56, inclusive, I have shown a modification of my invention in which the valve-stem of the tire does not pass through the same opening as that which receives the expanding and contracting means for the rim. As has been noted above, this arrangement is possible with most, if not all of the modifications illustrated in the preceding figures, although it is preferable and simplifies the construction to utilize the same opening through the wheel for both the valve-stem and the locking device where it can be done. In the modification shown in these figures, 320 is the wheel felly which carries a felly band 321. The felly has an opening 322 extending radially therethrough, the felly band being punched out to form a registering opening 323, and portions of the punched-out metal being bent down to form protective walls 324 and 325 for the ends of the opening 322. The felly also has an opening 326 formed therethrough for the reception of the valve-stem. The felly band has a raised flange 327 at one edge thereof, the periphery of this flange providing a seat for one side of the rim. The other side of the felly band has a slightly depressed flange 328 which provides a bearing surface of less diameter than the bearing surface of the flange 327 and is adapted to support the opposite side of the rim. 329 is the rim which may be of any suitable configuration. I have shown it as comprising a one-piece channel shaped to engage a straight-sided tire and transversely split as indicated at 330. The rim has a low rib 331 rolled in one side thereof adapted to overhang the flange 327 and prevent lateral movement of the rim in one direction. Near the other side the rim has a deeper rib 332 which seats upon the flange 328 of the felly band. The integral substantially vertical walls 333 of the channel engage the sides of the tire, the edges of the walls being outwardly turned to provide curved bearing surfaces or rolls 334 which prevent rim-cutting of the tire. These curved surfaces, as a matter of fact, form the principal bearing surfaces against which the pressure of the tire is exerted, and when the tire is inflated its base portions 335 tend to spread apart and to slide up over the curved surfaces 334. As the selvages of the tire are inextensible, this cannot take place, but the tendency causes the tire to exert its pressure upon the curved surfaces 334 in a substantially normal direction. The approximate direction of pressure upon the surfaces 334 is indicated by the arrows in Fig. 56. It will be seen that there is a large radial component to this force which tends directly to contact the rim upon the rim base. Thus, the contractive effect of the tire upon a rim of this character is analogous to the effect produced with the endless flanges engaging the outwardly flared surfaces of the side flanges of the rim base, as in the form of rim shown in Fig. 4. The contractive effect is much greater with a rim of the form shown in Fig. 56 than in the case of a one-piece clencher rim, as illustrated in Fig. 7. The hole in the rim for the valve-stem is preferably located near the split 330, so that the valve-stem clip 41 will bridge the gap formed when the rim is expanded, as shown in Fig. 55. This, however, is not essential. When the valve-stem is located as illustrated, however, the end of the rim through which it passes is provided with a plate 336 attached to the under-side thereof, the end of the plate being bent down to form an abutment 337 adapted to engage the wall 324 of the opening through the wheel. In order to anchor this end of the rim against movement and so protect the valve-stem, the plate preferably has a tubular lug 338 projecting from its under-side and surrounding the valve-stem, this lug being received in a socket 339 formed in the wheel. The opposite end of the rim has a lug 340 attached to its under-side and projecting therefrom beneath the end of the rim through which the valve-stem passes, so as to retain the ends of the rim in alinement. Journaled in this lug is an inclined screw 341. Screwing upon the latter is a block 342 which slides in a substantially radial direction between the face of the abutment 337 and the wall 325 of the opening in the wheel. It will be seen that when the block is moved toward and from the under-side of the rim by the rotation of the inclined screw, its motion will, owing to the inclination of the screw, have a circumferential component with relation to the under-side of the rim. When the rim is mounted upon the wheel, however, it will be seen that the block is held against circumferential movement, and therefore as it is moved toward and from the under-side of the rim the end of the rim will be moved circumferentially with relation to the wheel. As the opposite end of the rim is anchored against such movement, it will be seen that the rim will be expanded and contracted. The rim may also be expanded when removed from the wheel, as the end of the block 342 will engage the face of the abutment 337, so that when the block is screwed toward the under-side of the rim it will force the ends of the rim apart. The rim is shown expanded, ready for application to the wheel, in Fig. 55. Fig. 53 shows the rim locked in contracted position upon the wheel.

In describing the several modifications of my invention illustrated, I have referred to the rim or rim base as transversely split. It is to be understood that I intend to cover a rim or rim base split at more than one point as well as one with but a single division therein. When the rim is split at more than one point, its ends may be connected by a hinge or secured in position in any suitable manner.

While I have shown in the drawings accompanying this specification and described in detail certain preferred examples of my invention, it will be understood that there are many other forms in which my invention may be embodied. I regard the principle of my invention as novel and desire to cover the same broadly and without limitation as to details of structure any further than as specified in certain of the appended claims.

Having thus described my invention, I claim:

1. The combination with a vehicle wheel of a removable transversely split tire-carrying rim mounted thereon, said rim having an abutment at one end thereof, a wedge-block adapted to engage said abutment, and operating means for said wedge-block secured to the opposite end of said rim.

2. The combination with a vehicle wheel of a removable transversely split tire-carrying rim mounted thereon, and means for contracting said rim upon said wheel and holding it contracted comprising a wedge carried by said rim and engaging a portion of said wheel, and means carried by said rim for adjusting the position of said wedge with relation thereto.

3. The combination with a vehicle wheel of a removable transversely split tire-carrying rim, means for anchoring one end of said rim to said wheel, a wedge-block carried by the opposite end of said rim and adapted to engage a fixed part of said wheel to contract the rim and hold the same contracted, and operating means for said wedge-block.

4. The combination with a vehicle wheel of a removable transversely split tire-carrying rim mounted thereon, an abutment on said wheel, an abutment on one end of said rim, a movable block carried by the other end of said rim, said block being adapted to engage said abutments, and means for moving said block to cause the same to coact with one of said abutments to expand the rim, and with the other of said abutments to contract the rim.

5. The combination with a vehicle wheel of a removable transversely split tire-carrying rim mounted thereon, said wheel being provided with an inclined wedge face, an abutment on one end of said rim provided with an inclined wedge face, a wedge-block adapted to engage said inclined faces, and means for adjustably connecting said wedge-block to the opposite end of said rim, said means being capable of forcing said block to slide in contact with the inclined face on the wheel to contract the rim, and in contact with the inclined face on the abutment to expand the rim.

6. The combination with a vehicle wheel of a removable transversely split tire-carrying rim mounted thereon, the wheel having a wedge face inclined to a radius, an abutment on one end of said rim having a wedge face inclined to a radius, a wedge-block carried by the other end of said rim, and means for moving said wedge-block in a substantially radial direction toward and from said rim, said wedge-block when forced into engagement with the inclined wedge face of said wheel acting to contract said rim, and when forced into engagement with the inclined wedge face of said abutment acting to expand said rim.

7. The combination with a vehicle wheel having a radial opening therein of a removable transversely split tire-carrying rim mounted upon said wheel, said rim carrying a movable block adapted to be received in the opening in the wheel, and means for adjusting said block with relation to said rim to cause it to engage a wall of said opening.

8. The combination with a vehicle wheel having a radial opening therein, of a removable transversely split tire-carrying rim mounted thereon, said rim having an inwardly projecting radial stud adapted to pass through said opening in the wheel, a wedge-block mounted on said stud and having a wedge face inclined to a radius, and means for adjusting said block radially with relation to said rim to cause said inclined wedge face to coact with a wall of said opening in the wheel.

9. The combination with a vehicle wheel having a radial opening therein, of a removable transversely split tire-carrying rim mounted thereon, said rim having an abutment at one end thereof adapted to be received in said opening and carrying a movable wedge-block on the other end thereof also adapted to be received in said opening, said block being capable of engagement with said abutment to hold said rim expanded, and being capable of engagement with a wall of said opening to hold said rim contracted.

10. The combination with a vehicle wheel having a radial opening therein, of a removable transversely split tire-carrying rim mounted on said wheel, an abutment on one end of said rim adapted to enter said opening when the rim is mounted upon the wheel and engage one end wall of said opening, said abutment having a beveled end, an externally screw-threaded tubular stud journaled on the opposite end of said rim, a wedge-block screwing on said stud and having a wedge face inclined to a radius, said wedge-block being movable toward and from the under-surface of said rim by the rotation of said stud, said wedge face engaging the beveled face of said abutment when the block is moved toward the underside of said rim in one position, said block being capable of a reversal of position, the wedge face on said block when reversed being adapted to engage a wall of the opening through the wheel.

11. A removable transversely split tire-carrying rim for vehicle wheels having an offset member constituting an abutment secured to one end of said rim and a movable wedge permanently carried by the other end of said rim, and means for actuating said wedge to cause it to engage said abutment and expand said rim.

12. A removable transversely split tire-carrying rim for vehicle wheels having an offset member constituting an abutment secured to one end thereof, the other end of said rim having a rotatable screw-threaded stud attached thereto, and a wedge-block mounted on said stud and adapted to engage said abutment.

13. A removable transversely split tire-carrying rim for vehicle wheels having an abutment on one end thereof, the other end of said rim having journaled therein a radial externally threaded stud, and a block screwing on said stud having a wedge face inclined to a radius and adapted to engage said abutment.

14. A removable transversely split tire-carrying rim for vehicle wheels having an extension portion at one end thereof extending beyond said end and under the opposite end of the rim, said extension portion carrying an abutment projecting radially inward, an externally screw-threaded stud journaled upon the opposite end of said rim and projecting radially inward, and a wedge-block screwing on said stud, said wedge-block having a wedge face inclined to a radius, said wedge face adapted to coact with said abutment to expand the rim when the wedge block is moved toward the underside of the rim.

15. A removable tire-carrying rim for vehicle wheels comprising a transversely split rim base having an annular channel formed at each side thereof, the outer wall of each channel being formed by a flange comprising an outwardly flared portion having an inwardly hooked edge, endless tire-retaining flanges mounted upon said rim base having base portions adapted to interlock beneath the inwardly hooked edges of said side flanges, the inner surfaces of said endless tire-retaining flanges having approximately the same diameter as the outer surface of said rim base between said channels when the rim base is mounted upon a wheel, said channels being wide enough to receive the base portions of said endless flanges.

16. A vehicle wheel rim having a stud journaled therein, the end of said stud carrying a bushing fitting a hole in said rim, the end of said stud being riveted over upon said bushing.

JAMES H. WAGENHORST.

Witnesses:
 SEWARD DAVIS,
 KARL S. DEITZ.